United States Patent
Inoue et al.

(10) Patent No.: US 8,889,062 B2
(45) Date of Patent: Nov. 18, 2014

(54) CARBONACEOUS REFRACTORY AND METHOD OF PRODUCTION OF SAME AND ALSO BLAST FURNACE BOTTOM OR SIDE WALLS

(75) Inventors: Hiroyuki Inoue, Tokyo (JP); Michio Nitta, Tokyo (JP); Taijiro Matsui, Tokyo (JP); Tsutomu Wakasa, Shizuoka (JP); Yoshiyuki Yamagami, Shizuoka (JP); Toru Mochida, Shizuoka (JP)

(73) Assignees: Nippon Steel & Sumitomo Metal Corporation, Tokyo (JP); Nippon Electrode Co., Ltd., Shizuoka (JP)

( * ) Notice: Subject to any disclaimer, the term of this patent is extended or adjusted under 35 U.S.C. 154(b) by 332 days.

(21) Appl. No.: 13/138,416
(22) PCT Filed: Feb. 17, 2010
(86) PCT No.: PCT/JP2010/052801
§ 371 (c)(1), (2), (4) Date: Aug. 11, 2011
(87) PCT Pub. No.: WO2010/095757
PCT Pub. Date: Aug. 26, 2010

(65) Prior Publication Data
US 2011/0298166 A1 Dec. 8, 2011

(30) Foreign Application Priority Data
Feb. 17, 2009 (JP) ................. 2009-033979

(51) Int. Cl.
*F27B 1/10* (2006.01)
*F27D 1/00* (2006.01)
(Continued)

(52) U.S. Cl.
CPC ............ *C04B 35/013* (2013.01); *F27D 1/0006* (2013.01); *C04B 2235/3817* (2013.01);
(Continued)

(58) Field of Classification Search
USPC ................................ 266/280, 286
See application file for complete search history.

(56) References Cited

U.S. PATENT DOCUMENTS 5,576,254 A 11/1996 Nakamura et al.
6,875,716 B2 4/2005 Ishii et al.
(Continued)

FOREIGN PATENT DOCUMENTS

CN 1366515 8/2002
JP 58-43350 9/1983
(Continued)

OTHER PUBLICATIONS

International Search Report dated Mar. 30, 2010 issued in corresponding PCT Application No. PCT/JP2010/052801.
(Continued)

*Primary Examiner* — Scott Kastler
(74) *Attorney, Agent, or Firm* — Kenyon & Kenyon LLP (57) ABSTRACT

A carbonaceous refractory and a method of production is provided, which prevents a drop in the molten pig iron corrosion resistance, molten pig iron penetration resistance, and other properties of carbonaceous refractories required for blast furnace bottom refractories. The mechanical strength of the refractories is raised so as to suppress cracking due to thermal stress. The carbonaceous refractory comprises a carbonaceous material comprising one or more of calcined anthracite, calcined coke, natural graphite, or artificial graphite in 60 to 85 mass %, a refractory metal oxide in 5 to 15 mass %, metal silicon in 4 to 15 mass %, and carbon black in 2 to 10 mass %. An organic binder is added to refractory materials, which are kneaded, molded and fired in a nonoxidizing atmosphere.

12 Claims, 2 Drawing Sheets (51) Int. Cl.
  *C04B 35/528* (2006.01)
  *C04B 35/532* (2006.01)
  *C21B 7/06* (2006.01)
  *C04B 35/52* (2006.01)
  *B82Y 30/00* (2011.01)
  *C04B 35/01* (2006.01)
  *C04B 35/80* (2006.01)

(52) U.S. Cl.
  CPC ... *C04B 2235/3418* (2013.01); *C04B 2235/428* (2013.01); *C04B 2235/80* (2013.01); *C04B 35/528* (2013.01); *C04B 2235/424* (2013.01); *C04B 35/532* (2013.01); *C21B 7/06* (2013.01); *C04B 2235/5436* (2013.01); *C04B 2235/3217* (2013.01); *C04B 35/522* (2013.01); *C04B 2235/3463* (2013.01); *C04B 2235/5276* (2013.01); *C04B 2235/404* (2013.01); *B82Y 30/00* (2013.01); *C04B 2235/96* (2013.01); *C04B 2235/5454* (2013.01); *C04B 35/806* (2013.01); *C04B 2235/3206* (2013.01); *C04B 2235/3244* (2013.01); *C04B 2235/3222* (2013.01); *C04B 2235/5244* (2013.01); *C04B 2235/3843* (2013.01)
  USPC .......................................... 266/286; 266/280

(56) References Cited

U.S. PATENT DOCUMENTS

2002/0183189 A1    12/2002  Ishii et al.
2011/0298166 A1*   12/2011  Inoue et al. .................. 266/200

FOREIGN PATENT DOCUMENTS

| | | |
|---|---|---|
| JP | 63-151690 | 6/1988 |
| JP | 7-291712 | 11/1995 |
| JP | 2000-247755 | 9/2000 |
| JP | 2003-73175 | 3/2003 |
| WO | WO 01/74738 | 10/2001 |

OTHER PUBLICATIONS

Chinese Office Action of Jan. 17, 2013 issued in corresponding Chinese Application.

European Search Report, dated Jul. 11, 2012, issued in corresponding European application No. EP 10743880.

Michio Nitta: "Investigation of used carbon blocks for blast furnace hearth and development of carbon blocks with high thermal conductivity and high corrosion resistance", Nippon Technical Report No. 94 Jul. 2006, Jul. 1, 2006.

Michio Nitta et al: "Development of 1-5 carbon blocks for blast furnace hearths", Nippon Steel Technical Report No. 98 Jul. 2008, Jul. 1, 2088 (2008-07-81).

International Union of Pure and Applied Chemistry—Compendium of Chemical Terminology, Version 2.3.2, Aug. 19, 2012, pp. 206-207 and 641.

* cited by examiner

CARBONACEOUS REFRACTORY AND METHOD OF PRODUCTION OF SAME AND ALSO BLAST FURNACE BOTTOM OR SIDE WALLS

This application is a national stage application of International Application No. PCT/JP2010/052801, filed 17 Feb. 2010, which claims priority to Japanese Application No. 2009-033979, filed 17 Feb. 2009, which is incorporated by reference in its entirety.

TECHNICAL FIELD

The present invention relates to a carbonaceous refractory (carbon block) which is used as an inner lining refractory of a nonoxidizing atmosphere kiln, in particular a blast furnace bottom part and bottom side wall parts.

BACKGROUND ART

Recently, nonoxidizing atmosphere kilns, for example, blast furnaces, have been becoming larger in size. Along with this, operations have become more severe. High pressure operations, operations blowing in fine powder coal, etc. have led to increasing damage to the inner lining refractories.

On the other hand, in particular in blast furnaces, longer service life is being demanded in order to offset the high initial investment. The factor having a major effect on such blast furnace life is the durability of the inner lining materials at the side walls and bottom of the blast furnace hearth. As the inner lining materials for such locations, carbonaceous refractories are being used. That is, improvement of the durability of the carbonaceous refractories which are used as inner lining materials would have a direct effect of prolongation of blast furnace life.

Therefore, up until now, numerous proposals have been made regarding the formulation, production conditions, methods of use, etc. of carbonaceous refractories for prolonging blast furnace life.

For example, PLT 1 discloses a method of production of a carbonaceous refractory for blast furnace use comprising mixing metal silicon fine powder with a carbonaceous aggregate and firing the molded product in coke breeze so as to cause a reaction with the $N_2$ or CO gas which is present in the pores of the molded product, form Si—O—N-based whiskers in the pores, and reduce the size of 1 μm or larger pores in which molten pig iron can penetrate and thereby reduce the penetration of molten pig iron or gas into the pores.

Further, PLT 2 discloses a method of adding Al, Si, or other metal powder to a general refractory material to thereby make the structure resulting from the expansion of volume due to production of metal carbides and metal oxides denser, suppress the penetration of oxidizing gas and slag into the refractory structure, and improve the oxidation resistance and corrosion resistance.

Furthermore, PLT 3 discloses the method of adding pitch granules containing Al—Mg and Al—Si alloy and carbon black in carbon-containing unshaped refractories so as to cause the formation of a whisker net in the matrix and thereby improve the hot strength and wear resistance.

PLT 4 discloses, as mud for reducing use of an $SiO_2$-based material, a carbon filler for sealing a blast furnace taphole comprised of an aggregate containing a carbon material, alumina superfine powder, and a metal powder or aluminum and silicon or aluminum in combination to which an organic binder is added, so as to suppress the drop in slag resistance and hot strength of the filler (mud) for sealing a blast furnace taphole, and discloses to use carbon black with its small absorption of iodine for part of the carbon material.

PLTs 5 and 6 disclose carbonaceous refractories containing carbon, alumina, metal silicon, and one or more of titanium carbide, metal titanium, titanium nitride, and titanium carbonitride for balancing the slag resistance and melt loss resistance. That is, addition of alumina to a carbonaceous refractory is effective for melt loss resistance and contributes to reduction of the consumption rate, but excessive addition causes a drop in the slag resistance, so from the viewpoint of balancing the melt loss resistance and slag resistance, the amount of addition of alumina is kept to an extent not causing a drop in the slag resistance and the insufficient extent of slag resistance is secured by adding metal titanium or a titanium compound.

Further, PLTs 5 and 6 disclose, as carbonaceous refractories which are suitable for the inner linings of side walls and bottoms of blast furnace basins, carbonaceous refractories comprised of mixtures of a carbonaceous material, alumina fine powder, metal silicon fine powder, and one or more of titanium powder, titanium nitride powder, and titanium carbonitride powder to which an organic binder is added and kneaded, shaped, and fired in a nonoxidizing atmosphere.

CITATION LIST

Patent Literature

PLT 1: Japanese Patent Publication (B2) No. 58-43350
PLT 2: Japanese Patent Publication (A) No. 7-291712
PLT 3: Japanese Patent Publication (A) No. 2003-73175
PLT 4: Japanese Patent Publication (A) No. 2000-247755
PLT 5: Japanese Patent No. 3593101
PLT 6: WO01/074738

SUMMARY OF INVENTION

Technical Problem

As explained above, the factors causing damage to inner lining refractories in blast furnaces have been increasing. As the factors causing damage to inner lining carbonaceous refractories in blast furnaces, dissolution of carbon to the molten pig iron, fracture due to penetration of molten pig iron in the pores, formation of cracks due to penetration and reaction with alkali or zinc vapor, formation of cracks due to thermal stress, etc. may be mentioned.

However, PLT 1 only discloses to reduce the size of 1 μm or larger pores in a carbonaceous refractory structure so as to suppress the penetration of molten pig iron. Suppression of the formation of cracks due to thermal stress by improvement of the mechanical strength of a refractory is not disclosed or suggested at all.

Further, PLTs 2 and 3 have as their objects the addition of metal powder so as to cause the formation of metal oxides, whiskers, etc. in the refractory structure and improve the oxidation resistance, corrosion resistance, abrasion resistance, and hot strength. Data of amounts of addition of metal powder of about 1 to 2 wt % is disclosed, but according to studies by the inventors, with an amount of addition of metal powder of the extent of 1 to 2 wt %, the amount of whiskers and other reaction products will be insufficient. It was learned that when used as the inner lining refractories for the bottoms of blast furnaces, there was the problem that the refractories were insufficient in mechanical strength and cracking due to thermal stress could not be suppressed.

The mud of PLT 4 is used as a sealing use filler without firing. It is fired and hardened after filling. To secure the filling ability, a relatively large amount of a resin agent is added. At the time of firing and hardening, large air holes remain, the mechanical strength is low, and securing sufficient strength for forming the bottoms or side walls of blast furnaces becomes difficult. Further, since this is used as a sealing agent, strength has to be exhibited in the low temperature region. For example, metal Al has to be added to secure strength from the 600° C. temperature region. For this reason, at the time of firing, $Al_4C_3$ is produced by the Al and C, but at the time of production of $Al_4C_3$, the surrounding C is robbed, the microstructure changes, and a drop in quality is invited, so this is not preferable as a refractory forming the bottom and side walls of a blast furnace.

PLTs 5 and 6 have metal titanium or a titanium compound added. While they are superior in terms of slag resistance and melt loss resistance, it cannot be said that sufficient mechanical strength is provided for forming the bottom or side walls of a blast furnace.

Further, the carbonaceous refractories of PLTs 5 and 6 are superior in reduction of loss due to melting by the molten pig iron, but the mechanical strength of the refractories cannot be said to be sufficient.

The present invention was made to solve the above problems in the prior art and has as its object the provision of a carbonaceous refractory, and a method of production of the same, which prevent a drop in the molten pig iron corrosion resistance, molten pig iron penetration resistance, and other properties of carbonaceous refractories required for blast furnace bottom refractories and, further, raises the mechanical strength of the refractories so as to suppress cracking due to thermal stress and, also, a blast furnace bottom or side walls using the same.

Solution to Problem

To solve the above problem, the inventors studied the amounts of carbon black and metal silicon included in the conventionally used carbonaceous refractories and achieved higher strength of a carbonaceous refractory.

(1) A carbonaceous refractory characterized by being obtained by adding an organic binder to refractory materials which include a carbonaceous material comprised of one or more of calcined anthracite, calcined coke, natural graphite, or artificial graphite in 60 to 85 mass %, a refractory metal oxide in 5 to 15 mass %, metal silicon in 4 to 15 mass %, and carbon black in 2 to 10 mass %, made a total of 100 mass %, kneading them, then shaping and firing them in a nonoxidizing atmosphere.

(2) A carbonaceous refractory as set forth in (1) characterized by further containing, in the refractory materials, titanium carbide or metal titanium in 20 mass % or less.

(3) A carbonaceous refractory as set forth in (1) or (2) characterized in that the refractory metal oxide is alumina.

(4) A blast furnace bottom or side walls characterized by being lined inside with a carbonaceous refractory as set forth in (1) or (2).

(5) A blast furnace bottom or side walls characterized by being lined inside with a carbonaceous refractory as set forth in (3).

(6) A method of production of carbonaceous refractory characterized by mixing refractory materials comprised of a carbonaceous material comprised of one or more of calcined anthracite, calcined coke, natural graphite, or artificial graphite in 60 to 85 mass %, refractory metal oxide in 5 to 15 mass %, metal silicon in 4 to 15 masse, and carbon black in 2 to 10 mass % to give 100 mass %, adding an organic binder to the refractory materials, kneading them, then molding them, burying the molded products in coke breeze, and firing them in a 1200 to 1300° C. nonoxidizing atmosphere.

(7) A method of production of carbonaceous refractory as set forth in (6) characterized by further including, in the refractory materials, titanium carbide or metal titanium in 20 mass % or less.

(8) A method of production of carbonaceous refractory as set forth in (6) or (7) characterized in that the refractory metal oxide is alumina.

Advantageous Effect of Invention

According to the present invention, a carbonaceous refractory with a high mechanical strength can be produced while maintaining the properties required for blast furnace bottom refractories, that is, molten pig iron penetration resistance and molten pig iron corrosion resistance, at equivalent levels with conventional materials. Therefore, by using the carbonaceous refractory of the present invention as the inner lining refractories of blast furnace bottoms, it is possible to suppress the dissolution of carbon into the molten pig iron and the penetration of molten pig iron into the pores while suppressing cracking caused by thermal stress.

DESCRIPTION OF EMBODIMENTS

Below, preferred embodiments of the present invention will be explained in detail while referring to the attached drawings:

The inventors newly discovered that by adding an optimal amount of carbon black to carbonaceous refractory materials including metal Si, growth of SiC whiskers formed in pores during firing is promoted and the obtained carbonaceous refractory can be made high in strength and thereby perfected the present invention. This will be explained in detail below.

As explained above, the carbonaceous refractory of the present invention is obtained by adding an organic binder to refractory materials which include a carbonaceous material comprised of one or more of calcined anthracite, calcined coke, natural graphite, or artificial graphite in 60 to 85 mass %, a refractory metal oxide in 5 to 15 mass %, metal silicon in 4 to 15 mass %, and carbon black in 2 to 10 mass %, made a total of 100 mass %, kneading them, then shaping and firing them in a nonoxidizing atmosphere.

The carbonaceous material which is comprised of one or more of calcined anthracite, calcined coke, natural graphite, or artificial graphite, if less than 60 mass %, has an insufficient heat conductivity, while if over 85 mass %, gives a refractory with an overly large pore size and results in a drop in the resistance to penetration of molten pig iron, so the content is made 60 mass % to 85 mass %.

If the content of the refractory metal oxide is less than 5 mass %, the resistance to the molten pig iron becomes insufficient, while if over 15 mass %, the slag resistance and heat conductivity fall, so the content is made 5 to 15 mass %.

Here, the raw material of the refractory metal oxide, for example, the alumina, is preferably a fine powder. By adding a fine powder of the refractory metal oxide such as alumina, the specific surface area of the carbon exposed on the surface of the carbonaceous refractory can be reduced, so the resistance to corrosion by the molten pig iron is improved. No upper limit on the particle size is particularly set, but from the viewpoint of sufficiently enjoying the above effects, 74 μm or less is recommended. On the other hand, the lower limit of the particle size is not particularly defined either, but to prevent the escape route of gas which is produced inside at the time of firing from being blocked, the particle size is preferably made 1 μm or more.

Further, in the carbonaceous refractory of the present invention, the refractory metal oxide is a metal oxide which has a 1000° C. or more melting point and which has mechanical strength until the melting point. While not particularly limited, as the refractory metal oxide, in addition to alumina, zircon, magnesia, mullite, spinel, silica, zirconia, halfnia, and other high refractory metal oxides are preferable. By adding fine powders of these, an effect similar to that in the case of adding alumina is obtained for the resistance to corrosion by molten pig iron. This is as described by the applicant in Japanese Patent Publication (B2) No. 56-18559.

Note that, alumina, which can be easily made a fine powder and which further is inexpensive cost wise, is more preferable.

If the content of the metal silicon is less than 4 mass %, SiC whiskers are not sufficiently formed in the pores, so the effect of making the pores finer is insufficient and the resistance to penetration by molten pig iron falls. Further, even if sufficiently adding carbon black as explained later, the amount of the whiskers which is formed is small, so there is almost no effect of increase of the strength obtained. On the other hand, if over 15 mass %, unreacted metal silicon ends up remaining and the corrosion resistance falls, so the content is made 4 to 15 mass %. The lower limit value of the content of the metal silicon, from the viewpoint of forming SiC whiskers more reliably in the pores, is more preferably made 8 mass %.

Further, the raw material of the metal silicon is preferably a fine powder. By adding a fine powder of metal silicon, the reactivity with the carbon black becomes higher and growth of the whiskers is promoted. The upper limit of the particle size is not particularly set, but to prevent unreacted metal silicon from remaining, a maximum particle size of 74 μm or less is recommended. On the other hand, the lower limit value of the particle size is also not particularly set, but to prevent the escape route of gas which is produced inside at the time of firing from being blocked, this is preferably made the minimum particle size of 1 μm or more. Note that, the particle size of the fine powder metal silicon can be measured, for example, using a laser scattering diffraction type particle size distribution measurement apparatus.

Note that, if metal aluminum is present in the refractory materials, it will react and bond with the surrounding carbon during the firing of the carbon block and become aluminum carbide. At this time, the surrounding carbon is robbed, so the microstructure changes and a drop in quality is invited. Due to this, the metal aluminum has to be kept from contaminating the refractory materials as much as possible.

The present invention is further characterized by containing carbon black in 2 to 10 mass %.

If less than 2 mass %, even if the above metal silicon content is within a suitable range, since the amount of whiskers formed is small, almost no effect of raising the strength over that of a conventional carbonaceous refractory can be obtained. On the other hand, if over 10 mass %, unreacted carbon black easily remains, the obtained carbonaceous refractory rises in porosity, and the mechanical strength ends up falling. Therefore, the carbon black content is made 2 to 10 mass %.

By way of note, the inventors studied this while changing the amount of addition of carbon black, whereupon they found that up to 5 mass %, the refractory rises in strength along with an increase in the amount of addition of carbon black, but if further increasing the amount of addition of carbon black, the strength of the refractory falls somewhat as a general trend. That is, they learned that if the amount of addition of carbon black is 4 to 6 mass %, the strength of the refractory peaks and that an effect of improvement of strength of about 25% compared with conventional carbonaceous refractory is obtained. Therefore, if aiming at maximization of the strength of the refractory, the amount of addition of carbon black is preferably made 4 to 6 mass %.

The carbon black particles which are added are small in particle size. The upper limit is not particularly defined, but the smaller the particle size, the higher the specific surface area and the higher the reactivity with the metal silicon fine powder, so average particle size is preferably made 300 nm or less.

On the other hand, the lower limit value of the average particle size of the carbon black particles is not particularly defined, but from the viewpoint of handling, 30 nm or more is recommended. Note that, the average particle size of the carbon black particles can, for example, be made the arithmetic average size found by observation under an electron microscope.

Further, when further strengthening the molten pig iron resistance, the refractory materials preferably further include titanium carbide or metal titanium in 20 mass % or less (see PLT 6).

If over 20 mass %, the effect on the molten pig iron resistance remains unchanged, while machining becomes difficult. On the other hand, the lower limit is not particularly defined. If included, there is an effect in improvement of the molten pig iron resistance, but to enjoy the effect more reliably, 5 mass % or more is preferably included.

Further, the added titanium carbide or metal titanium is preferably a fine powder. The smaller the particle size, the more the formation of a protective layer on the refractory operating surface is promoted and the lighter the loss due to dissolution of carbon.

Therefore, from a practical viewpoint, the size is preferably made 35 μm or less. The lower limit of the particle size is not particularly defined, but from the viewpoint of handling, 1 μm or more is recommended. An organic binder is added to the above refractory materials, then the mixture is kneaded, shaped, and fired in a nonoxidizing atmosphere to obtain the carbonaceous refractory of the present invention.

Here, as the organic binder, it is preferable to use coal tar pitch, phenol resin, etc. containing a carbon ingredient.

Further, the kneading, shaping, and firing may be performed by the usual broadly known methods. However, for the firing, since a carbonaceous material is covered, a nonoxidizing atmosphere must be used for the firing. Further, the firing is performed at the usual 1200 to 1300° C. or so.

Details of the mechanism of rise of strength of the present invention are not clear, but this is believed to have a close relationship with the addition of the metal silicon fine powder and carbon black contained as additive materials.

Calcined anthracite, artificial graphite, etc. are mixed to obtain the carbon aggregate. Further, metal silicon fine powder and an organic binder are added to this and kneaded. The result is molded into a block of a predetermined shape, then this block is buried in coke breeze. Heated air is sent to this to heat it to about 1300° C. and fire it. This being so, the majority of the metal silicon reacts with the carbon aggregate and forms SiC.

Further, part of the metal silicon which faces the inside surfaces of the pores bonds with the oxygen inside the pores to form $SiO_2$ (formula 1). This $SiO_2$ further bonds with other metal silicon to form an SiO gas (formula 2).

$$Si(s)+O_2(g) \rightarrow SiO_2(s) \quad \text{(formula 1)}$$

$$SiO_2(s)+Si(s) \rightarrow 2SiO(g) \quad \text{(formula 2)}$$

Further, the carbon which faces the inside surfaces of the pores also reacts with the oxygen in the pores and becomes CO gas (formula 3).

$$C(s)+\tfrac{1}{2}O_2(g) \rightarrow CO(g) \quad \text{(formula 3)}$$

Due to the reaction of the thus formed SiO gas and CO gas, SiC whiskers are formed in the pores (formula 4).

$$SiO(g)+3CO(g) \rightarrow SiC(s)+2CO_2(g) \quad \text{(formula 4)}$$

Note that, the CO gas which is supplied for the reaction of (formula 4) includes not only the gas resulting from the (formula 3), but also the gas which is supplied from the surroundings in the usage environment.

When there is carbon black present in this reaction system, the specific surface area of the carbon black is much larger than that of the artificial graphite or other carbon aggregate contained, so the chemical reactivity is much higher than with the carbon sources of the carbon aggregate. Due to this, the reaction of (formula 3) is promoted, the reaction of (formula 4) which forms crystals of SiC whiskers in the pores becomes more pronounced, and, as shown in the later explained examples, the SiC whiskers become larger in diameter. As a result, the carbonaceous refractory is believed to increase in mechanical strength.

Further, the method of production of a carbonaceous refractory of the present invention need only be a method which adds an organic binder to the above refractory materials, kneads and shapes them, and fires them in a nonoxidizing atmosphere, but when firing the molded products in a nonoxidizing atmosphere, the method of burying the molded products in coke breeze and, in that state, heating the molded products and firing them in a 1200 to 1300° C. nonoxidizing atmosphere is recommended from the viewpoint of costs etc. As the method of heating the molded products, for example, the method of using heated air to burn heavy oil or another fuel, using combustion gas made a high temperature by that combustion to heat walls of the heating oven, and using heat conduction from the walls to heat molded products buried in coke breeze set in the heating oven may be mentioned. The firing period may be suitably set according to the ratio of composition of the refractory materials etc., but, for example, in a nonoxidizing atmosphere, by raising the temperature to a maximum peak temperature of 1250° C. and firing over two weeks or so, then holding at the maximum peak temperature for two days, the desired carbonaceous refractory can be produced.

As explained above, the carbonaceous refractory of the present invention has a sufficient resistance to penetration by molten pig iron and resistance to corrosion by molten pig iron and is high in mechanical strength, so is preferably used as the inner lining material of blast furnace bottoms or blast furnace bottom side walls. Due to this, it is possible to suppress the dissolution of carbon to the molten pig iron and penetration of molten pig iron in the pores while suppressing cracking due to thermal stress and possible to reduce damage to the inner lining material and extend blast furnace life.

EXAMPLES

Below, examples will be used to explain the present invention in further detail.

In accordance with the formulations shown in Table 1, the following procedure was followed to obtain carbonaceous refractories of Invention Examples 1 to 9 and Comparative Examples 1 to 6.

As the carbonaceous material, artificial graphite was used. Further, as the refractory metal oxides of alumina and zirconia ($ZrO_2$), an average particle size 3 to 4 μm alumina fine powder and zirconia ($ZrO_2$) fine powder were used, while as the metal silicon, a particle size 74 μm or less metal silicon fine powder was used. Further, as the carbon black, one with an average particle size of 50 nm was used. Furthermore, as the organic binder, a mixture of phenol resin and coal tar pitch in a mass ratio of 3:2 was used.

Further, as the procedure for production of the refractory, the above organic binder was separately added in 19 mass % to a total 100 mass % of the refractory materials shown in Table 1. The mixture was kneaded, then the kneaded mixture was injected into a mold at a pressure of about 20 MPa to form an about 55×100×200 mm size block. This block was buried in coke breeze, heated air was used to burn the heavy oil, and the combustion gas was used to raise the temperature in a nonoxidizing atmosphere (in a CO gas atmosphere) over two weeks up to 1250° C. for firing to obtain each carbonaceous refractory shown in Table 1. Note that the unit of the composition of materials shown in Table 1 was mass % (only organic binder separately applied).

Each obtained carbonaceous refractory was evaluated for mechanical strength by cutting out a 25×25×160 mm block shape and subjecting this to a three-point flexural test at room temperature to compare the bending strength. Note that the three-point flexural test was performed in accordance with JIS R 7212 by supporting a block shaped test piece by two rollers, applying a load from the top center by one roller, and performing calculations from the maximum load up to fracture and the distance between the support points.

From the remaining samples after the bending strength test, 9×9×18 mm block shapes were cut out and investigated for porosity by mercury porosimetry. Note that for the measurement of porosity by mercury porosimetry, a sample was placed in a container enabling vacuum treatment, the sample was covered by mercury, then pressure was applied to the mercury as a whole so make the mercury penetrate the pores of the sample, then the relationship between the pressure applied at that time and the volume of the penetrated mercury was measured.

Further, a pressurized penetration test was used to observe the degree of penetration of the molten pig iron. The test conditions of the pressurized penetration test were processing the obtained carbonaceous refractory to a crucible shape, then placing about 1550° C. molten pig iron in the crucible sample and then further pressurizing the inside of this crucible sample in a high temperature atmosphere by 0.5 MPa argon gas for 4 hours. After this, the inside of the crucible was gradually cooled while leaving the molten pig iron in it. After the molten pig iron in the crucible solidified, the crucible sample was cut open and X-ray transmission was used to visually confirm the presence of any penetration of molten pig iron to the refractory and evaluate the penetrating ability of molten pig iron.

Further, for the carbonaceous refractories of Invention Example 5, 8, and 9, the erosion rate was found by a molten pig iron corrosion resistance evaluation test. The test conditions were processing the obtained carbonaceous refractories into 20 mmφ×180 mm columnar shapes and immersion in about 1550° C. molten pig iron for 1 hour in an argon atmosphere. The erosion rate was found from the following formula by measuring the sample size before and after immersion.

$$\text{Erosion rate (\%)} = \frac{(\text{Diameter before test})^2 - (\text{Diameter after test})^2}{(\text{Diameter before test})^2}$$

Figure 1:
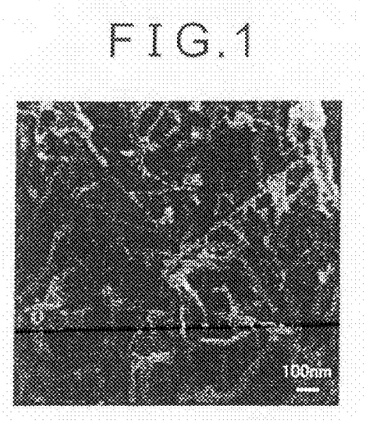
FIG. 1 is a photograph, under a field emission scanning electron microscope, of a fractured face of a carbonaceous refractory of Comparative Example 3.
Figure 2:
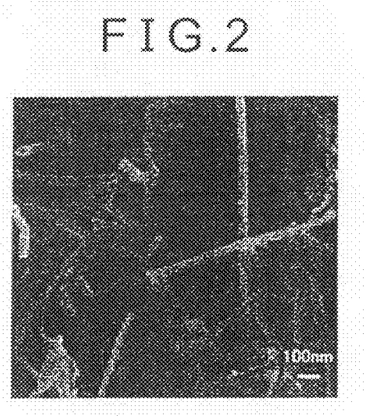
FIG. 2 is a photograph, under a field emission scanning electron microscope, of a fractured face of a carbonaceous refractory of Invention Example 5.
Figure 3:
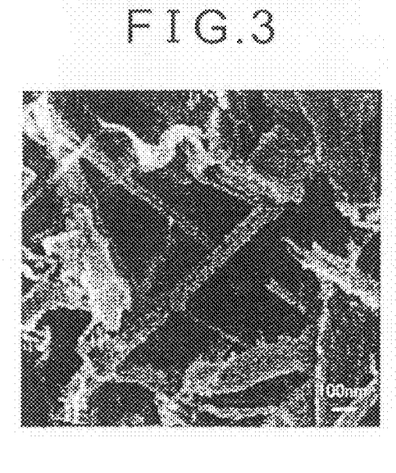
FIG. 3 a photograph, under a field emission scanning electron microscope, of a fractured face of a carbonaceous refractory of Invention Example 6.

Furthermore, for the carbonaceous refractories of Comparative Example 3 and Invention Examples 5 and 6, 7×7×10 mm block shapes were cut out and the center parts of the long sides were split to expose fracture faces. These fracture faces were observed using a field emission scanning electron microscope (FE-SEM). A comparison was made of the SiC whiskers formed in the refractor pores. The photographs are shown in FIGS. 1 to 3.

Figure 4:
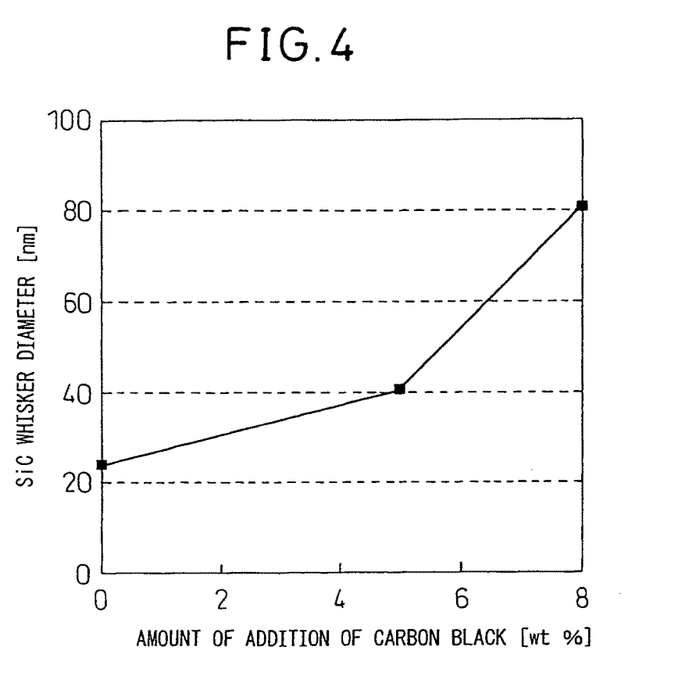
FIG. 4 is a graph showing an example of the relationship between the amount of addition of carbon black and the average diameter of SiC whiskers.

Based on this photograph, the thicknesses of any 30 of the SiC whiskers were measured. As shown in FIG. 4, the relationship of the diameters of the SiC whiskers (average diameter of any 30 SiC whiskers) to the amount of addition of carbon black was determined.

(Effect of Inclusion of Carbon Black)

From Table 1, compared with Comparative Examples 1 to 5 in which no carbon black is added, Comparative Example 6 and Invention Examples 1 to 9 in which carbon black was added showed a rise in the bending strength as a general trend. However, Comparative Example 6 contained metal silicon fine powder in a low 3 mass %, so the bending strength only rose slightly.

In particular, in Invention Examples 5 and 9 in which carbon black is added in 5 mass % under conditions of metal silicon fine powder of 8 mass %, the strength rose the most, about 39%, compared with Comparative Example 3 in which no carbon black was added.

(Effect of Inclusion of Metal Silicon)

From Table 1, in Comparative Examples 2 to 5 and Invention Examples 1 to 9 to which metal silicon fine powder was added in 5 mass % or more, no molten pig iron penetration was observed, while in Comparative Examples 1 and 6 to which metal silicon fine powder was added in 3 mass %, molten pig iron penetration was observed. However, Comparative Examples 2 to 5 do not have any carbon black added, so the bending strength was low. This shows that the growth of whiskers and their filling the pores results in an improvement in the corrosion resistance.

(Effect of Inclusion of TiC)

From Table 1, it was learned that in Invention Example 8 in which TiC was added, a 5.0% erosion rate was shown, while in Invention Examples 5 and 9 in which no TiC was added, there was an about double molten pig iron corrosion resistance.

Below, it is learned that even in Invention Examples 5 and 9, there is a sufficient molten pig iron corrosion resistance, while in Invention Example 8, there is an extremely excellent molten pig iron corrosion resistance. Further, from the FE-SEM photographs of the fractured faces of these carbonaceous refractories (FIGS. 1 to 3), it was learned that compared with Comparative Example 3 which had metal silicon fine powder in 8 mass % and had no carbon black added, in Invention Examples 5 and 6 in which carbon black was added, the SiC whiskers grew and the SiC whiskers became thicker.

FIG. 4 shows the relationship between the amount of addition of carbon black and the average diameter of SiC whiskers. The diameter of the whiskers in Comparative Example 3 where carbon black is not yet added was about 23 nm, while in Invention Example 5 where carbon black was added in 5 mass %, it was about 40 nm and further in Invention Example 6 in which it was added in 8 mass %, it was 80 nm. The trend was observed of the diameter of the SiC whiskers becoming larger along with an increase in the amount of addition of carbon black.

Therefore, compared with not adding carbon black, it is believed that by adding carbon black in 5 mass %, growth of the SiC whiskers produced in the pores is promoted, the increase in the diameter of the SiC whiskers causes a denser structure, and the mechanical strength rises.

However, it is believed that, when adding carbon black in 8 mass % or more, the SiC whiskers further increase in diameter, but unreacted carbon black easily remains and the porosity rises, so the mechanical strength ends up falling. Therefore, the amount of carbon black added has to be made 2 to 10 mass % in range, but when targeting the maximum bending strength, inclusion around 5 mass % is desirable.

As explained above, it was confirmed that addition of carbon black promotes the growth of SiC whiskers formed inside the structure and that, as a result, the porosity falls and the mechanical strength rises, but when the amount of addition of metal Si is 3 mass %, that is, is not sufficiently added, the growth of SiC whiskers becomes insufficient and molten pig iron ends up penetrating. That is, it was confirmed that in a carbonaceous refractory like in the present invention where the mechanical strength is improved and molten pig iron does not penetrate, addition of the desired amount of metal silicon fine powder and the desired amount of carbon black is important.

TABLE 1

| | | Comp. Ex. 1 | Comp. Ex. 2 | Comp. Ex. 3 | Comp. Ex. 4 | Comp. Ex. 5 | Comp. Ex. 6 | Inv. Ex. 1 | Inv. Ex. 2 | Inv. Ex. 3 | Inv. Ex. 4 | Inv. Ex. 5 | Inv. Ex. 6 | Inv. Ex. 7 | Inv. Ex. 8 | Inv. Ex. 9 |
|---|---|---|---|---|---|---|---|---|---|---|---|---|---|---|---|---|
| Materials | Artificial graphite | 87 | 85 | 82 | 77 | 72 | 85 | 83 | 80 | 78 | 75 | 77 | 74 | 72 | 68 | 77 |
| | $Al_2O_3$ fine powder | 10 | 10 | 10 | 10 | 10 | 10 | 10 | 10 | 10 | 10 | 10 | 10 | 10 | 10 | — |
| | $ZrO_2$ (zirconia) fine powder | — | — | — | — | — | — | — | — | — | — | — | — | — | — | 10 |

TABLE 1-continued

|  |  | Comp. Ex. 1 | Comp. Ex. 2 | Comp. Ex. 3 | Comp. Ex. 4 | Comp. Ex. 5 | Comp. Ex. 6 | Inv. Ex. 1 | Inv. Ex. 2 | Inv. Ex. 3 | Inv. Ex. 4 | Inv. Ex. 5 | Inv. Ex. 6 | Inv. Ex. 7 | Inv. Ex. 8 | Inv. Ex. 9 |
|---|---|---|---|---|---|---|---|---|---|---|---|---|---|---|---|---|
|  | Metal silicon fine powder | 3 | 5 | 8 | 13 | 18 | 3 | 5 | 8 | 10 | 13 | 8 | 8 | 8 | 8 | 8 |
|  | Carbon black | — | — | — | — | — | 2 | 2 | 2 | 2 | 2 | 5 | 8 | 10 | 5 | 5 |
|  | TiC fine powder | — | — | — | — | — | — | — | — | — | — | — | — | — | 9 | — |
|  | (Material subtotal) | (100) | (100) | (100) | (100) | (100) | (100) | (100) | (100) | (100) | (100) | (100) | (100) | (100) | (100) | (100) |
|  | Organic binder | 19 | 19 | 19 | 19 | 19 | 19 | 19 | 19 | 19 | 19 | 19 | 19 | 19 | 19 | 19 |
| Properties | Bending strength (MPa) | 15.9 | 16.1 | 16.5 | 17.0 | 16.7 | 18 | 19.9 | 20.8 | 21.0 | 21.2 | 22.9 | 19.9 | 18.4 | 23.6 | 22.9 |
|  | Porosity (%) | 26.5 | 25.9 | 25.7 | 25.5 | 25.6 | 23.9 | 22.4 | 21.5 | 21.2 | 21.1 | 19.8 | 22.4 | 23.6 | 18.6 | 19.8 |
|  | Erosion rate (%) | — | — | — | — | — | — | — | — | — | — | 9.2 | — | — | 5.0 | 9.2 |
|  | Molten pig iron penetration | Yes | No | No | No | No | No | No | No | No | No | No | No | No | No | No |
| Fracture FE-SEM photo |  | — | — | FIG. 1 | — | — | — | — | — | — | — | FIG. 2 | FIG. 3 | — | — | — |

Above, preferred embodiments of the present invention were explained, but the present invention is not limited to these examples of course. A person skilled in the art clearly could conceive of various types of modifications or revisions within the scope described in the claims. It will be understood that these also fall within the technical scope of the present invention.

The invention claimed is:

1. A carbonaceous refractory, comprising:
an organic binder added to refractory materials, the refractory materials comprising:
a carbonaceous material comprising one or more of calcined anthracite, calcined coke, natural graphite, and artificial graphite in an amount of 60 to 85 mass %, a refractory metal oxide in an amount of 5 to 15 mass %, metal silicon having a particle size of 1 to 74 μm in an amount of 4 to 15 mass %, and carbon black having an average particle size of 30 to 300 nm in an amount of 4 to 6 mass %, wherein
the binder and refractory materials are kneaded, shaped, and then fired in a nonoxidizing atmosphere.

2. The carbonaceous refractory as set forth in claim 1, wherein the refractory materials further comprise titanium carbide or metal titanium in an amount of 20 mass % or less.

3. The carbonaceous refractory as set forth in claim 1, characterized in that said refractory metal oxide is alumina.

4. A blast furnace bottom or blast furnace side wall, lined inside with a carbonaceous refractory, the carbonaceous refractory comprising an organic binder added to refractory materials, the refractory materials comprising:
a carbonaceous material comprising one or more of calcined anthracite, calcined coke, natural graphite, and artificial graphite in an amount of 60 to 85 mass %, a refractory metal oxide in an amount of 5 to 15 mass %, metal silicon having a particle size of 1 to 74 μm in an amount of 4 to 15 mass %, and carbon black having an average particle size of 30 to 300 nm in an amount of 4 to 6 mass %, wherein
the binder and refractory materials are kneaded, shaped, and then fired in a nonoxidizing atmosphere.

5. The blast furnace bottom or blast furnace side wall, as set forth in claim 4, wherein the refractory metal oxide is alumina.

6. A method of production of a carbonaceous refractory, comprising:
mixing refractory materials comprising a carbonaceous material comprising one or more of calcined anthracite, calcined coke, natural graphite, or artificial graphite in an amount of 60 to 85 mass %, a refractory metal oxide in an amount of 5 to 15 mass %, metal silicon having a particle size of 1 to 74 μm in an amount of 4 to 15 mass %, and carbon black having an average particle size of 30 to 300 nm in an amount of 4 to 6 mass %,
adding an organic binder to the refractory materials,
kneading the binder and refractory materials, then molding the kneaded binder and refractory materials, burying the molded binder and refractory materials in coke breeze, and firing the buried binder and refractory materials in a 1200° to 1300° C. nonoxidizing atmosphere.

7. The method of production of carbonaceous refractory as set forth in claim 6, wherein the refractory materials further comprise titanium carbide or metal titanium in an amount of 20 mass % or less.

8. The method of production of carbonaceous refractory as set forth in claim 6, wherein the refractory metal oxide is alumina.

9. The method of production of carbonaceous refractory as set forth in claim 7, wherein the refractory metal oxide is alumina.

10. The carbonaceous refractory as set forth in claim 2, wherein the refractory metal oxide is alumina.

11. The blast furnace bottom or blast furnace side wall as set forth in claim 4, wherein the refractory materials further comprise titanium carbide or metal titanium in an amount of 20 mass % or less.

12. The blast furnace bottom or blast furnace side wall as set forth in claim 5, wherein the refractory materials further comprise titanium carbide or metal titanium in an amount of 20 mass % or less.

* * * * *

UNITED STATES PATENT AND TRADEMARK OFFICE
CERTIFICATE OF CORRECTION

| | |
|---|---|
| PATENT NO. | : 8,889,062 B2 |
| APPLICATION NO. | : 13/138416 |
| DATED | : November 18, 2014 |
| INVENTOR(S) | : Hiroyuki Inoue et al. |

Page 1 of 1

It is certified that error appears in the above-identified patent and that said Letters Patent is hereby corrected as shown below:

In the Specification

Column 3, line 67, change "4 to 15 masse, and" to -- 4 to 15 mass%, and --.

Signed and Sealed this
Fourth Day of August, 2015

Michelle K. Lee
*Director of the United States Patent and Trademark Office*